United States Patent
Jaecklin et al.

[15] 3,707,329
[45] Dec. 26, 1972

[54] APPARATUS FOR ELECTRONICALLY ANALYZING MODULATED LIGHT BEAMS

[72] Inventors: Andre Jaecklin, Ennetbaden; Jiri Mastner, Niederrohrdorf; Friedrich K. von Willisen, Zurich, all of Switzerland

[73] Assignee: Aktiengesellschaft Brown, Boveri & Cie, Baden, Switzerland

[22] Filed: Feb. 17, 1971

[21] Appl. No.: 116,176

[30] Foreign Application Priority Data

Feb. 25, 1970 Switzerland................2794/70

[52] U.S. Cl.................................356/117, 324/96
[51] Int. Cl..........................G01n 21/40, G01r 31/00
[58] Field of Search..........324/96; 356/117; 350/160

[56] References Cited

UNITED STATES PATENTS 3,419,802  12/1968  Pelenc et al............................324/96

Primary Examiner—Ronald L. Wibert
Assistant Examiner—Conrad Clark
Attorney—Pierce, Scheffler & Parker

[57] ABSTRACT

Apparatus for analyzing a light beam modulated by a quantity to be measured in which two parallel electrical signals are derived from the modulated beam, the signals being shifted in phase relative to each other and being described by functions with a sine or cosine with an argument proportional to the quantity being measured. These signals are then added to produce a phase-modulated signal proportional to the measurement. To avoid errors in measurement due to an inherent drift effect in the photo-detectors on which the electrical signals appear, the beam of light is periodically interrupted (or attenuated) independently of the modulation effect produced by the quantity being measured and each of the electrical signals prior to the addition step is passed through a filter having a flat pass characteristic in the range of the interruption (or attenuation) frequency plus/minus the maximum variation in time of the argument proportional to the quantity measured and a cut-off frequency below twice the interrupter (or attenuation) frequency. One of the signals is also passed through a $\pi/2$ phase-shifter before the addition.

8 Claims, 4 Drawing Figures

APPARATUS FOR ELECTRONICALLY ANALYZING MODULATED LIGHT BEAMS

This invention relates to an improved apparatus for electronic analysis of a beam of light which is modulated with a quantity to be measured and from which two parallel electrical signals are derived which are phase-shifted in relation to one another and which may be described by functions having a sine or cosine with an argument proportional to the quantity, and which are then added in an adding network in order to produce a phase-modulated signal.

Such modes of analysis are known, for example, from Swiss Pat. No. 433,065 or the German laid-open specification 1,918,730. In the known methods, a beam of light is modulated as regards intensity by interferometric means by the magnetic field of the alternating current of a high-voltage line. Electrical signals, which are phase-displaced by $\pi/2$ in relation to one another, are then derived from the modulated beams of light by means of photo-diodes and have substantially the following form:

$$i^{(1)}(t) = i_o^{(1)}(1 + \cos \phi(t)) \quad (1)$$
$$i^{(2)}(t) = i_o^{(2)}(1 + \sin \phi(t)) \quad (2)$$

In this case, $i_o^{(1)}$ and $i_o^{(2)}$ are constants, while $\phi(t)$ is the argument which is proportional to the generally sinusoidally time dependent quantity to be measured, the line current.

Apart from the intensity modulation of the beam of light by interferometric means, it is also known (IEEE J. Quant. El. QE–2 (1966) 255), to turn the direction of polarization of a linearly polarized beam of light by means of a Faraday rotator mounted in the magnetic field of the line current, then to split the beam of light into two perpendicular directions of polarization in a modified Glan-Thompson prism, and then to convert the two partial beams intensity-modulated in this manner, into electrical signals by means of photo-detectors. The two electrical signals may also be described by a sine or cosine with an argument proportional to the quantity to be measured, but here the two signals have a phase shift of $\pi$.

A modification of the last-mentioned known mode of analysis such that the phase shift amounts to $\pi/2$, so that the analyzing electronic system according to the first-mentioned printed documents can be used, is the subject of a proposal which has not yet been published and leads to considerable improvements in the sensitivity and accuracy of the analysis.

In the proposed mode, however, the carrier frequency has to be produced by a local oscillator, and multipliers have to be provided for mixing the carrier frequency with the electrical signals derived from the beam of light. In addition, slowly variable, or even direct-current signals have to be transmitted by means of the photo-detectors, as a result of which considerable errors in the measurement may occur because of the drift of the temperature-responsive dark current of the detectors, particularly infra-red sensitive geranium diodes.

It is the general object of the present invention to provide an improved mode for electronic analysis of beams of light modulated in the manner indicated, which eliminates the disadvantageous influence of a drift in the photo-detectors and at the same time reduces the technical expenditure.

The problem is solved in that the beam of light is periodically interrupted or weakened, independently of the modulation by the quantity being measured, before the addition, the two electrical signals are each conveyed through a filter having a flat pass characteristic curve in the region of the interruption or attenuation frequency plus/minus the maximum variation in time of the argument proportional to the quantity measured and a limiting frequency below twice the interruption or attenuation frequency, and one of the two electrical signals is also passed through a $\pi/2$ phase shifter before the addition.

In this manner, the carrier frequency is produced by the intensity-modulation of the beam of light caused by means of the periodic interruption or attenuation, and the local oscillator and the multipliers can be omitted. The periodic intensity-modulation may be caused by an electro-mechanical light chopper or by optical modulators (Pockels cell, Kerr cell, Faraday modulator).

In addition, the harmful influence of parasitic dark currents and drifts of the photo-diodes which serve to convert the light into the electrical signals is avoided. With the periodic intensity-modulation according to the invention, the quantity measured is given by the amplitudes of the alternating-current signal instead of by direct-current values.

Mathematically, the invention can be explained as follows:

The two electrical signals represented above in equations (1) and (2) are generally described, for a non-sinusoidal periodic interruption of the beam of light, by the equations $$i_1(t) = i_o^{(1)}(1 + \cos \phi(t)) \sum_{n=1}^{\infty} q_n \cdot \sin(n \cdot \omega t + \delta_n) \quad (3)$$

$$i_2(t) = i_o^{(2)}(1 + \sin \phi(t)) \sum_{n=1}^{\infty} q_n \cdot \sin(n \cdot \omega t + \delta_n) \quad (4)$$

In this case, the total representation is the general mode of notation of the Fourier's analysis of an interruptor function with the period $T = 2\pi/\omega$, with $q_n$ as amplitudes of the individual oscillations and $\delta_n$ as the phase constants thereof.

The filters to be used in accordance with the invention cause the exclusion of all harmonics, that is to say, all individual oscillations with frequencies greater than/equal to $2\omega$. With this, and with the phase-shift of an electrical signal by $\pi/2$, then after addition of the two signals, a signal is obtained having the carrier frequency $\omega$ and the phase $\phi(t)$ which is proportional to the quantity measured, which signal can be demodulated by conventional means, particularly by means of a phase discriminator, so that $\phi(t)$ and hence the quantity measured can be represented.

In order to eliminate the "1" in the first brackets of equations (3) and (4), according to an advantageous embodiment of the invention, the two electrical signals $i_1(t), i_2(t)$ are each supplied to a like input of an amplifier, for example an operational amplifier, into the other input of which there is introduced, in each case, a third electrical signal which is derived from the beam of light after the interrupter or attenuating device, but before the device for converting the modulation caused by the quantity being measured into intensity fluctuations. This signal has the form:

$$i_3(t) = i_o^{(3)} \sum_{n=1}^{\infty} q_n \sin(n \cdot \omega t + \delta_n) \quad (5)$$

Signals of the form:

$$i_4 = i_1 - i_3 = i_0 \cos \phi(t) \sum_{n=1}^{\infty} q_n \sin(n \cdot \omega t + \delta_n) \quad (6)$$

$$i_5 = i_2 - i_3 = i_0 \sin \phi(t) \sum_{n=1}^{\infty} q_n \sin(n \cdot \omega t + \delta_n) \quad (7)$$

then appear at the outputs of the amplifiers if the regulation of the amplifications is made $i_o^{(1)} = i_o^{(2)} = i_o^{(3)} = i_o$.

After passage of the signals through the filter, signals of the form:

$$i_6 = i_o \cos \phi(t) \cdot q_1 \cdot \sin(\omega t + \delta_1) \quad (8)$$
$$i_7 = i_o \sin \phi(t) \cdot q_1 \cdot \sin(\phi t + \delta_1) \quad (9)$$

are obtained or:

$$i_6 = (J_{ol}/2)[\sin(\omega t + \delta_1 + \phi(t)) + \sin(\omega t + \delta_1 - \phi(t))] \quad (10)$$

$$i_7 = (J_{ol}/2)[\cos(\omega t + \delta_1 - \phi(t)) - \cos(\omega t + \delta_1 + \phi(t))] \quad (11)$$

in which $i_0 q_1 = J_0$.

The $\pi/2$ phase shifter in the channel of the signal $i_7$ leads to a signal of the form:

$$i_8 = (J_{ol}/2)[-\sin(\omega t + \delta_1 - \phi(t)) + \sin(\omega t + \delta_1 + \phi(t))] \quad (12)$$

If the signals $i_6$ and $i_8$ are now added, then a signal of the form:

$$i_9 = i_6 + i_8 = J_o \sin(\omega t + \delta_1 + \phi(t)) \quad (13)$$

is obtained.

By adjusting the time scale, i.e. alignment with the phase of the reference signal of the phase discriminator, $\delta_1$ can be made zero, so that now a signal of the form:

$$i_{10} = J_o \sin(\omega t + \phi(t)) \quad (14)$$

is available from which the quantity $\phi(t)$ which is proportional to the quantity measured can be obtained by phase demodulation in conventional manner.

As indicated above, the filters must be so designed that they have a very flat pass characteristic with regard to amplitude and phase in the range:

$$\omega \pm (d\phi/dt)_{max} \quad (15)$$

that is to say, do not produce any amplitude distortion or delay distortion in the given frequency range. $(d\phi/dt)_{max}$, the maximum variation in time of the argument $\phi$ in the sine or cosine of the electrical input signals, is proportional to the maximum frequency occurring in the quantity measured. Accordingly, the $\pi/2$ phase shifter provided in the second channel must cause a precise $\pi/2$ phase-shift for all frequencies defined in equation (15), because otherwise the resulting signals would no longer correspond to the equations given above.

As follows from the sampling theorem, it is further advisable, for the most faithful signal transmission possible, for the interrupter or attenuation frequency $\omega$ to be greater than double the value of the maximum variation in time in the quantity $\phi$, $(d\phi/dt)_{max}$, proportional to the quantity measured.

The filters may appropriately be constructed in the form of band-pass filters. The filter in the one channel may be combined with the phase-shifter necessary here.

The invention is explained in more detail below with reference to examples of embodiments illustrated in the accompanying drawings wherein.

Figure 1:
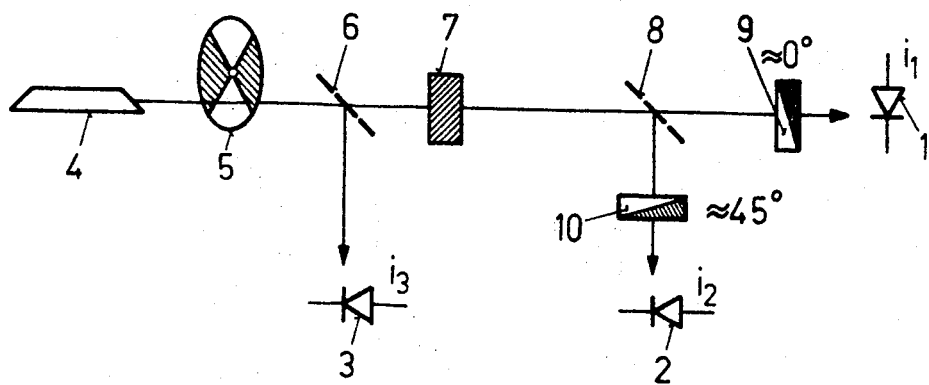
FIG. 1 is a diagrammatic view showing the course of the beam of light as far as the photo-detectors.

With reference now to FIG. 1, a laser 4 is illustrated from which a linearly polarized beam of light passes to a mechanical light chopper 5 in the form of a rotating diaphragm. After passing through the rotating diaphragm 5, the beam of light passes to a beam-splitter 6, for example a semi-reflecting mirror. In this manner, a first beam component passes to a photo-detector 3, for example a germanium diode, and a second beam component to the sensor 7. This sensor 7 serves for modulation of the beam of light with the quantity measured, for example the magnetic field created by a line current. It consists, for example, of a block of flint glass or a YIG crystal which is disposed in the magnetic field created by the line current, and turns the direction of polarization of the linearly polarized laser beam through an angle of $\phi/2$ which is proportional to the particular value of the quantity measured, as a result of the Faraday effect.

Following the sensor 7, the beam of light is again divided in another beam-splitter 8. The two beam components are each supplied to a polarizer 9, 10 respectively, the directions of polarization of which are turned substantially through $\pi/4$ in relation to one another. Behind the polarizer 9, therefore, there is formed an intensity-modulated beam of light with the intensity:

$$S_1 = S_o^{(1)}(1 + \cos \phi(t)) \quad (16)$$

and behind the polarizer 10, an intensity-modulated beam of light with the intensity:

$$S_2 = S_o^{(2)}(1 + \sin \phi(t)) \quad (17)$$

if the beam of light is not interrupted by the rotating diaphragm 5. The two beams of light produce proportional electrical signals in the photo-detectors 1 and 2.

If the diaphragm 5 is set into rotation, the currents $i_1$, $i_2$, $i_3$ appear at the photo-diodes 1, 2 and 3 in accordance with equations (3), (4) and (5).

Figure 2:
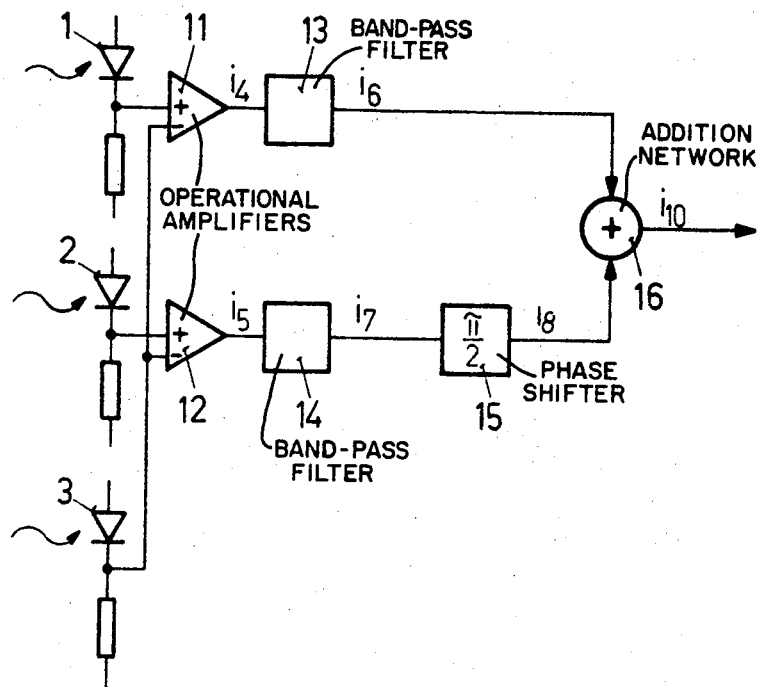
FIG. 2 is a schematic diagram of the electronic system for analyzing the electrical signals produced in the photodetectors.

As can be seen from FIG. 2, the signals from the photo-diodes 1, 2 and 3 are supplied to operational amplifiers 11, 12 in the manner illustrated. Signals $i_4$, $i_5$ in accordance with equations (6), (7) then appear at the outputs of the amplifiers. In the two channels, there are then disposed band-pass filters 13, 14 at the outputs of which there appear signals $i_6$, $i_7$ in accordance with equations (8), (9). The phase-shifter 15 in the second channel then causes a signal $i_8$ in accordance with equation (12).

By addition in the addition network 16, a current $i_{10}$ is obtained in accordance with equation (14) if the phase constant $\delta_1$ of the fundamental oscillation of the interrupter function is made equal to zero. This is effected by appropriate adjustment of the phase of the reference signal in the phase discriminator to which the signal $i_{10}$ is supplied and which is not illustrated because it is known.

Figure 3:
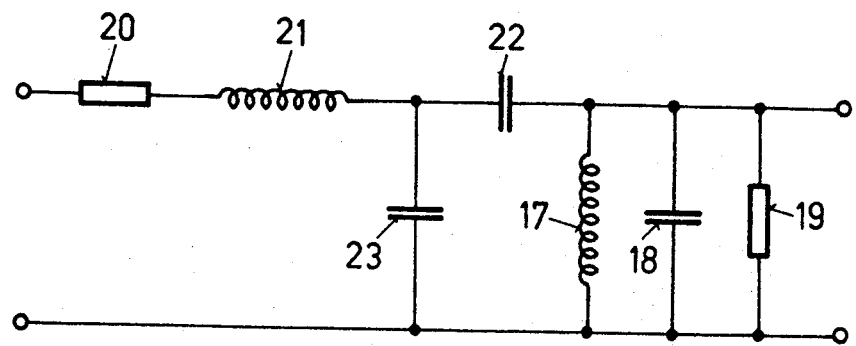
FIG. 3 illustrates a suitable band-pass filter.

FIG. 3 represents a band-pass filter such as may be used, for example, at 13 in FIG. 2. The arrangement of the individual elements is known, for example from F. E. Termann, Radio Engineer's Handbook, McGraw Hill, 1943 pp 154–172. The band-pass filter comprises the primary resonance circuit 21, 23 and the damping resistance 20, and the secondary resonance circuit 17, 18, and the damping resistance 19. The coupling is caused by capacitance 22.

Figure 4:
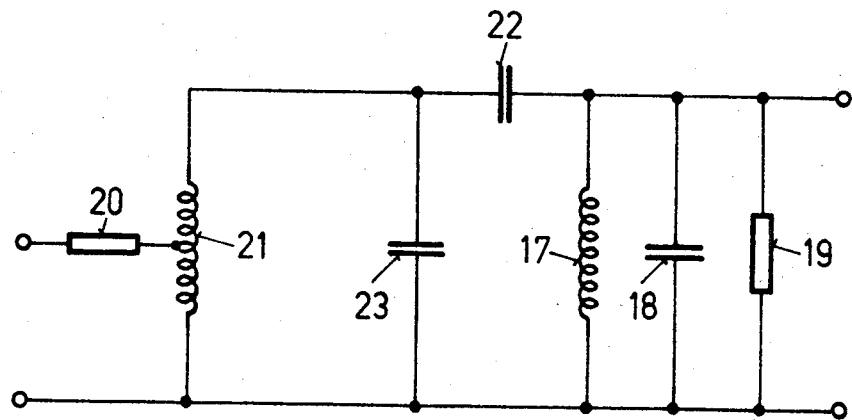
FIG. 4 illustrates a band-pass filter combined with a $\pi/2$ phase-shifter.

By a simple modification of the circuit illustrated in FIG. 3, namely parallel injection of the primary resonance circuit in the tap of coil 21 through the damping resistance 20, band-pass filter 14 and phase-shifter 15, as shown in FIG. 2 may advantageously be united in one network. This modification is illustrated in FIG. 4.

We claim:

1. Apparatus for measuring an electrical current represented by a time-dependent quantity $\phi$ (t) comprising:
   means for producing a beam of linearly polarized light,
   means for periodically varying the intensity of said polarized light beam at a frequency $\omega$,
   a magneto-optical element through which the current is passed to produce a corresponding time-dependent magnetic field, said intensity-varied polarized light beam being directed through said magneto-optical element which thereby effects a rotation of the polarization plane through an angle proportional to the time-dependent magnetic field,
   an optical divider through which said light beam is passed after passing through said magneto-optical element, said optical divider serving to split said light beam into first and second partial light beams,
   first and second polarizers through which said first and second partial light beams are respectively passed and whose respective polarization planes differ from each other by an angle of substantially 45°,
   a first photo-detector into which said first partial light beam is directed after passing through said first polarizer and from which a corresponding first electrical signal is produced,
   a second photo-detector into which said second partial light beam is directed after passing through said second polarizer and from which a corresponding second electrical signal is produced,
   means producing a third electrical signal having a periodically varied amplitude corresponding to the periodic variation in the intensity of said polarized light beam,
   means combining said first and third electrical signals to produce a fourth electrical signal,
   means combining said second and third electrical signals to produce a fifth electrical signal,
   first and second filters through which said fourth and fifth electrical signals are respectively passed, said filters having a flat pass characteristic in the frequency range $\omega \pm (d\phi/dt)_{max}$ and one of said filters having a 90° phase-shifter device connected therewith, and an
   additive network combining the outputs from said filters for producing a final output electrical signal constituting a measurement of the time-dependent current.

2. Apparatus as defined in claim 1 for measuring a generally sinusoidal time-dependent current wherein the phase constant $(\delta_1)$ of the fundamental oscillation $(q_1 \sin \omega t)$ of the function of the periodic variation of the intensity of said polarized light beam is made equal to zero.

3. Apparatus as defined in claim 1 for measuring a generally sinusoidal time-dependent current wherein the frequency $\omega$ at which the intensity of said polarized light beam is varied is greater than twice the value of the maximum variation in time of the argument $(d\phi/dt)_{max}$ of the time-dependent current.

4. Apparatus as defined in claim 1 for measuring a generally sinusoidal time-dependent current wherein the amplitude of said third electrical signal is equal to the amplitudes of said first and second electrical signals.

5. Apparatus as defined in claim 1 for measuring a generally sinusoidal time-dependent current wherein said filters are of the band-pass type and wherein the frequency $\omega$ at which the intensity of said polarized light beam is varied is greater than twice the value of the maximum variation in time of the argument $(d\phi/dt)_{max}$ of the time-dependent current.

6. Apparatus as defined in claim 1 for measuring a generally time-dependent current wherein one of said filters and the 90° phase-shifter device connected therewith are integrated into a common network.

7. Apparatus as defined in claim 1 for measuring a generally sinusoidal time-dependent current wherein said means for periodically varying the intensity of said polarized light beam is constituted by a chopper interposed in the path of said beam and which serves to periodically interrupt said beam.

8. Apparatus for measuring an electrical current represented by a time-dependent quantity $\phi$ (t) comprising:
   means for producing a beam of linearly polarized light, means for periodically varying the intensity of said polarized light beam at a frequency $\omega$,
   a magneto-optical element including a coil through which the current is passed to produce a corresponding time-dependent magnetic field,
   a first optical divider into which said polarized light beam of variable intensity is passed and which serves to split said light beam into first and second partial light beams, said first partial light beam being directed through said magneto-optical element which thereby effects a rotation of the polarization plane through an angle proportional to the time-dependent magnetic field,
   a second optical divider through which said second partial light beam is passed after passing through said magneto-optical element, said second optical divider serving to split said second partial light beam into third and fourth partial light beams, first and second polarizers through which said third and fourth partial light beams are respectively passed and whose respective polarization planes differ from each other by an angle of substantially 45°, a first photo-detector into which said third partial light beam is directed after passing through said first polarizer and from which a corresponding first electrical signal is produced, a second photo-detector into which said fourth partial light beam is directed after passing through said second polarizer and from which a corresponding second electrical signal is produced, a third photo-detector into which said second partial light beam is directed and from which a corresponding third electrical signal is produced, means for combining said first and third electrical signals to produce a fourth electrical signal, means for combining said second and third electrical signals to produce a fifth electrical signal, first and second filters through which said fourth and fifth electrical signals are respectively passed, said filters having a flat pass characteristic in the frequency range $\omega \pm (d\phi/d)_{max}$. and one of said filters having a 90° phase-shifter device connected therewith, and an additive network combining the outputs from said filters for producing a final output electrical signal constituting a measurement of the time-dependent current.

* * * * *